United States Patent
Hu et al.

(10) Patent No.: US 12,452,908 B2
(45) Date of Patent: Oct. 21, 2025

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Yi Hu, Dongguan (CN); Haitao Li, Dongguan (CN)

(73) Assignee: GUANGDONG OPPO TELECOMMUNICATIONS CORP., LTD., Dongguan (CN)

( * ) Notice: Subject to any disclaimer, the term of this patent is extended or adjusted under 35 U.S.C. 154(b) by 402 days.

(21) Appl. No.: 18/084,185

(22) Filed: Dec. 19, 2022

(65) Prior Publication Data

US 2023/0131188 A1    Apr. 27, 2023

Related U.S. Application Data

(63) Continuation of application No. PCT/CN2020/097138, filed on Jun. 19, 2020.

(51) Int. Cl.
*H04W 74/0833*  (2024.01)
*H04W 74/00*    (2009.01)
(Continued)

(52) U.S. Cl.
CPC ..... *H04W 74/006* (2013.01); *H04W 74/0833* (2013.01); *H04W 74/0836* (2024.01); *H04W 74/0838* (2024.01)

(58) Field of Classification Search
CPC .............. H04W 72/002; H04W 72/004; H04W 72/006; H04W 72/0833
See application file for complete search history.

(56) References Cited

U.S. PATENT DOCUMENTS

2020/0036430 A1*  1/2020  Kim ................. H04W 74/0833
2020/0100179 A1   3/2020  Zhou et al.
(Continued)

FOREIGN PATENT DOCUMENTS

| CN | 110546982 A | 12/2019 |
| CN | 110972515 A | 4/2020 |
| CN | 111052839 A | 4/2020 |

OTHER PUBLICATIONS

Extended European Search Report dated Jun. 7, 2023 received in European Patent Application No. EP20941127.1.
(Continued)

*Primary Examiner* — Kent Krueger
(74) *Attorney, Agent, or Firm* — Sheppard, Mullin, Richter & Hampton LLP

(57) ABSTRACT

A wireless communication method and a terminal device are provided, which are capable of both BFR and power saving of the terminal device. The method includes: transmitting, by a terminal device, first information to a network device, the first information being uplink information in a random access procedure triggered by Beam Failure Recovery (BFR); receiving, by the terminal device, first instruction information transmitted by the network device, the first instruction information instructing the terminal device to skip monitoring of Physical Downlink Control Channel (PDCCH); and determining, by the terminal device, whether to skip monitoring of PDCCH based on the first instruction information.

20 Claims, 3 Drawing Sheets

FIG. 4

(51) Int. Cl.
*H04W 74/0836* (2024.01)
*H04W 74/0838* (2024.01)

(56) References Cited

U.S. PATENT DOCUMENTS

| | | | |
|---|---|---|---|
| 2020/0213067 A1* | 7/2020 | Cirik | H04L 5/0051 |
| 2021/0392521 A1* | 12/2021 | Yamada | H04W 74/04 |
| 2022/0110184 A1* | 4/2022 | Jeon | H04W 74/0841 |
| 2022/0183075 A1* | 6/2022 | Jiang | H04W 52/0216 |
| 2022/0361237 A1* | 11/2022 | Hofström | H04L 5/0078 |
| 2023/0119893 A1* | 4/2023 | Li | H04W 24/08 |
| | | | 370/329 |

OTHER PUBLICATIONS

Apple Inc "View on PDCCH skipping" 3GPP Draft; RP-191108, 3rd Generation Partnership Project (3GPP), Mobile Competence Centre; 650, Route Des Lucioles; F-06921 Sophia-Antipolis Cedex France vol. TSG RAN, No. New Port Beach, US; Jun. 3, 2019-Jun. 6, 2019, Jun. 2, 2019 (Jun. 2, 2019), XP051747321, 7 pages.
International Search Report and Written Opinion dated Mar. 17, 2021 in International Application No. PCT/CN2020/097138. English translation attached.
CATT. "RAN2 Impacts of PDCCH based WUS", 3GPP TSG-RAN WG2 Meeting #106 R2-1905666, May 2, 2019 (May 2, 2019), pp. 1-5.

\* cited by examiner

WIRELESS COMMUNICATION METHOD AND TERMINAL DEVICE

CROSS-REFERENCE TO RELATED APPLICATIONS

This application is a continuation of Patent Application No. PCT/CN2020/097138 filed on Jun. 19, 2020, the entire disclosure of which is incorporated herein by reference.

TECHNICAL FIELD

The embodiments of the present disclosure relate to communication technology, and more particularly, to a wireless communication method and a terminal device.

BACKGROUND

For the purpose of power saving of terminals, a concept of Discontinuous Reception (DRX) has been proposed. Specifically, a network device can configure a terminal device to wake up at the time known by the network (DRX ON) to monitor a Physical Downlink Control Channel (PDCCH), and the network can also configure the terminal device to sleep at the time known by the network (DRX OFF) so as not to monitor the PDCCH.

In the 3rd Generation Partnership Project (3GPP) Release 17 (Rel-17), further researches have been carried out on energy saving schemes of terminal devices in the connected state when DRX is configured. One scheme is to introduce a PDCCH skipping mechanism, that is, the network can instruct the terminal device to skip PDCCH monitoring for a period of time by transmitting dynamic signaling. For a terminal device configured with DRX, the UE monitors the PDCCH during DRX active time. When the terminal device receives a PDCCH skipping instruction from the network device, the terminal device shall follow the PDCCH skipping instruction and skip monitoring of the PDCCH during the following PDCCH skipping duration, even if the UE is in the DRX active time in the PDCCH skipping duration.

However, in some scenarios, the terminal device can trigger an uplink transmission autonomously so as to expect a further response from the network device. For example, if the terminal device triggers a Beam Failure Recovery (BFR) on a primary cell, it will initiate random access on the primary cell. Since the terminal device expects the network device to respond, it needs to monitor the PDCCH. In this case, if a PDCCH skipping instruction is received from the network device, how the terminal device can monitor the PDCCH while taking into account both reception of the response from the network and power saving of the terminal device is an urgent problem to be solved.

SUMMARY

Embodiments of the present disclosure provide a wireless communication method and a terminal device, capable of both receiving a response from a network and power saving of the terminal device.

In a first aspect, a wireless communication method is provided. The method includes: transmitting, by a terminal device, first information to a network device, the first information being uplink information in a random access procedure triggered by Beam Failure Recovery (BFR); receiving, by the terminal device, first instruction information transmitted by the network device, the first instruction information instructing the terminal device to skip monitoring of Physical Downlink Control Channel (PDCCH); and determining, by the terminal device, whether to skip monitoring of PDCCH based on the first instruction information.

In a second aspect, a terminal device is provided. The terminal device is configured to perform the method according to the above first aspect or any possible implementation thereof. In particular, the terminal device includes units configured to perform the method according to the above first aspect or any possible implementation thereof.

In a third aspect, a terminal device is provided. The terminal device includes a processor and a memory. The memory stores a computer program, and the processor is configured to invoke and execute the computer program stored in the memory to perform the method according to the above first aspect or any implementation thereof.

In a fourth aspect, a chip is provided. The chip is configured to perform the method according to the above first aspect or any implementation thereof.

In particular, the chip includes a processor configured to invoke and execute a computer program from a memory, to cause a device provided with the chip to perform the method according to the above first aspect or any implementation thereof.

In a fifth aspect, a computer-readable storage medium is provided. The computer-readable storage medium stores a computer program that causes a computer to perform the method according to the above first aspect or any implementation thereof.

In a sixth aspect, a computer program product is provided. The computer program product includes computer program instructions that cause a computer to perform the method according to the above first aspect or any implementation thereof.

In a seventh aspect, a computer program is provided. The computer program, when executed on a computer, causes the computer to perform the method according to the above first aspect or any implementation thereof.

With the above technical solutions, after the terminal device transmits the uplink information for random access, if it receives the PDCCH skipping instruction from the network device, it can control monitoring of PDCCH based on the time interval between it transmitting the uplink information and it receiving the PDCCH skipping instruction and the RTT of signal transmission between the terminal device and the network device, thereby taking into account both receiving a response from the network and power saving of the terminal device.

DESCRIPTION OF EMBODIMENTS

Figure 1:
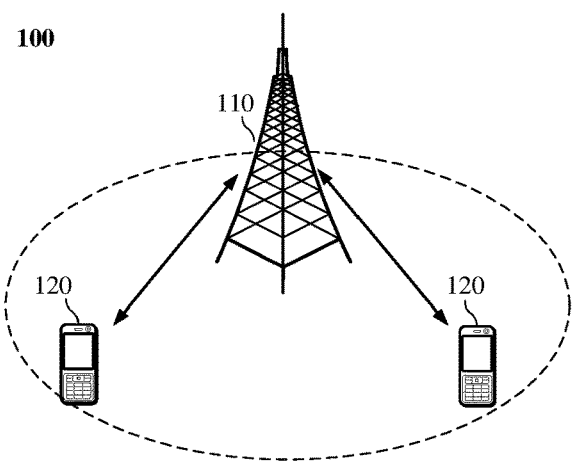
FIG. 1 is a schematic diagram showing an application scenario according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, a communication system 100 in which an embodiment of the present disclosure can be applied is schematically shown in FIG. 1. The communication system 100 may include a network device 110, which may be a device communicating with terminal devices 120 (or referred to as communication terminal or terminal). The network device 110 may provide communication coverage for a particular geographic area, and may communicate with terminal devices located within the coverage.

FIG. 1 illustratively shows one network device and two terminal devices. Optionally, the communication system 100 may include multiple network devices, and the coverage of each network device may include other numbers of terminal devices. The embodiment of the present disclosure is not limited to this.

Optionally, the communication system 100 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal devices 120 with communication functions. The network device 110 and the terminal devices 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In a communication system, a UE may perform Beam Failure Detection (BFD) and Beam Failure Recovery (BFR) procedures for each serving cell based on a network configuration. In the beam failure detection, the UE can detect a beam failure on a currently serving Channel State Information Reference Signal (CSI-RS) or a Synchronization Signal Block (SSB). The beam failure recovery is used by the UE to indicate a new SSB/CSI-RS to the serving cell for subsequent data transmission.

Specifically, a Media Access Control (MAC) layer of the terminal device performs beam failure detection based on a beam failure instance indication (beamFailureInstance) reported by a physical layer. The Radio Resource Control (RRC) of a network device configures the UE with parameters for beam failure detection, e.g., a maximum number of beam failure instances (beamFailureInstanceMaxCount) and a beam failure detection timer (beamFailureDetectionTimer). Candidate resources for beam failure detection, such as SSB/CSI-RS resources, may also be configured separately for each serving cell of the UE.

Optionally, the UE may separately maintain a corresponding beam failure detection operation for each serving cell.

Specifically, for each serving cell, the MAC layer of the UE may maintain a counter (BFI_COUNTER) for beam failure detection, that is, a beam failure instance counter, where the initial value of BFI_COUNTER is 0.

If the MAC layer receives a beam failure instance indication from the physical layer, it:
  1. Starts or restarts beamFailureDetectionTimer;
  2. Increments the counter BFI_COUNTER by 1;
  3. If BFI_COUNTER is greater than or equal to beamFailureInstanceMaxCount, then:
    3.1. If the serving cell is a secondary cell (SCell), the UE triggers BFR for the SCell;
    3.2. If the serving cell is a special cell (SpCell), e.g., a primary cell (PCell) or a primary secondary cell (PSCell), the UE initiates a random access procedure on the SpCell.

Further, if beamFailureDetectionTimer expires, or the UE receives reconfiguration parameters for beam failure detection, such as one or more of SSB/CSI-RS resources, beamFailureInstanceMaxCount or beamFailureDetectionTimer, the UE resets the counter BFI_COUNTER to 0.

If the UE triggers BFR on the SpCell and the random access succeeds, the UE performs the following operations for the SpCell:
  1. Resets the counter BFI_COUNTER to 0;
  2. Stops beamFailureRecoveryTimer;
  3. Considers the beam failure recovery procedure to be successfully completed.

If the UE triggers at least one BFR for SCell and the BFR has not been cancelled, then:

Case 1: If the UE has an uplink resource available for new transmission, then:

If the uplink resource can carry an SCell BFR Media Access Control Control Element (MAC CE) plus a subheader, the UE generates an SCell BFR MAC CE in a MAC packetization process. Otherwise, if the uplink resource can carry a truncated SCell BFR MAC CE plus a subheader, the UE generates a truncated SCell BFR MAC CE in a MAC packetization process.

Case 2: The UE does not have an uplink resource available for new transmission, and the UE triggers a Scheduling Request (SR) for SCell beam failure recovery.

In some embodiments, in order to support the BFR process, the network may configure BFR parameters for the UE via Radio Resource Control (RRC) signaling, and the BFR parameters may include at least one of:
  a contention-free-based Random Access Channel (RACH) resource for beam failure recovery, rach-ConfigBFR;
  a list of candidate beams for BFR and their corresponding RACH parameters, candidateBeamRSList;
  an L1-RSRP threshold for beam selection by the UE, e.g., rsrp-ThresholdSSB, rsrp-ThresholdCSI-RS; or a beam failure recovery timer for controlling a maximum time length for contention-free-based random access used by the UE in the BFR process, beamFailureRecoveryTimer.

To initiate a random access procedure, the UE may perform random access initialization and select a random access resource.

In the random access initialization phase, the UE can select a random access type. As an example, it can be selected as follows.

If the network configures a contention-free-based four-step random access RACH resource for beam failure recovery on an active Uplink Bandwidth Part (UL BWP) of the currently selected uplink carrier for the UE, the UE can select to use contention-free-based four-step random access (i.e., 4-step CFRA).

Otherwise, if the network configures both a four-step random access based RACH resource and a two-step random access based RACH resource on an active UL BWP of the currently selected uplink carrier for the UE, and the UE has Reference Signal Receiving Power (RSRP) for downlink reference path loss that is higher than a pre-configured threshold, or if the network only configures a two-step random access based RACH resource for the UE on the active UL BWP of the currently selected uplink carrier, the UE can select to use contention-based two-step random access (2-step CBRA). Otherwise, the UE can select to use contention-based four-step random access (4-step CBRA).

If the UE selects to use four-step random access, the UE starts beamFailureRecoveryTimer.

Random Access RACH Resource Selection

For contention-free-based four-step random access (4-step CFRA):

If beamFailureRecoveryTimer is running or the network does not configure beamFailureRecoveryTimer, and the network configures a contention-free-based RACH resource for BFR, and there is at least one SSB in the network-configured candidate beams for BFR that has SS-RSRP higher than rsrp-ThresholdSSB configured by the network, or there is at least one CSI-RS having CSI-RSRP higher than rsrp-ThresholdCSI-RS configured by the network, the UE selects an SSB from the candidate SSBs each having SS-RSRP higher than rsrp-ThresholdSSB, or selects a CSI-RS from the candidate CSI-RSs each having CSI-RSRP higher than rsrp-ThresholdCSI-RS, as a target reference signal.

For contention-based four-step random access: if there is at least one SSB having a corresponding SS-RSRP higher than rsrp-ThresholdSSB configured by the network, an SSB having a corresponding SS-RSRP higher than rsrp-ThresholdSSB can be selected; or otherwise an SSB can be selected arbitrarily.

For contention-based two-step random access: if there is at least one SSB having a corresponding SS-RSRP higher than msgA-RSRP-ThresholdSSB configured by the network, an SSB having a corresponding SS-RSRP higher than msgA-RSRP-ThresholdSSB can be selected as a target reference signal; or otherwise an SSB can be selected arbitrarily as a target reference signal.

A random access procedure is further initiated using the target reference signal.

The specific steps of the three types of random access procedures will be described below.

The contention-based four-step random access may specifically include the following steps.

Step 1: the terminal device transmits a random access preamble (or Msg 1) to the network device.

The random access preamble may also be referred to as a preamble, a preamble sequence, a random access preamble sequence, or the like.

Optionally, in some embodiments, the network configures the UE with a set of candidate SSBs, a set of random access preamble resources and random access occasion (RACH Occasion, or RO) resources, and the terminal device randomly selects from contention-based random access resources in the selected SSB, and sets a preamble index (PREAMBLE_INDEX) to the selected random access preamble. The network device can estimate a transmission delay between the network device and the terminal device according to the preamble, and calibrate the uplink timing accordingly, and can roughly determine the resource size required for the terminal device to transmit a Msg 3.

Step 2: the network device transmits a Random Access Response (RAR) i.e., Msg 2, to the terminal device.

After the terminal device transmits the preamble to the network device, it can start a random access response window (ra-ResponseWindow), and monitor a corresponding PDCCH in ra-ResponseWindow according to a Random Access Radio Network Temporary Identifier (RA-RNTI). If the terminal device detects a PDCCH scrambled with the RA-RNTI, it can obtain a Physical Downlink Shared Channel (PDSCH) scheduled by the PDCCH. Here, the PDSCH includes an RAR corresponding to the preamble.

Optionally, the RA-RNTI is calculated according to the time-frequency position of a PRACH for transmitting the preamble. Therefore, if more than one terminal device transmits preambles on the same RO, the corresponding RARs are multiplexed in the same RAR Media Access Control Protocol Data Unit (MAC PDU).

If the terminal successfully receives the PDCCH scrambled with the RA-RNTI corresponding to the RO resource for transmitting the preamble, and the RAR contains a MAC subPDU which carries a Random Access Preamble Identifier (RAPID) that corresponds to PREAMBLE_INDEX selected in the Msg 1, the RAR is successfully received, and the terminal can decode and obtain a Timing Advance Command (TAC), an uplink grant resource (UL Grant) and a Temporary Cell Radio Network Temporary Identity (TC-RNTI), for transmission of the Msg 3.

If the PDCCH scrambled with the RA-RNTI corresponding to the RO resource for transmitting the preamble is not received within ra-ResponseWindow, or the PDCCH scrambled with the RA-RNTI is received, but the RAR does not contain a MAC subPDU corresponding to PREAMBLE_INDEX, it is considered that the RAR reception fails in either case. At this time, if the number of preamble transmissions has not exceeded a maximum number of transmissions (preambleTransMax) configured by the network, the terminal device needs to retransmit the Msg 1. If the number of preamble transmissions has exceeded the maximum number of transmissions (preambleTransMax) configured by the network, the terminal device reports the random access problem to the higher layer.

Step 3: the terminal device transmits the Msg 3.

After receiving the RAR message, the terminal device determines whether the RAR is an RAR message belonging to itself. For example, the terminal device can use the preamble index for checking, and after determining that it is an RAR message belonging to itself, it can generate the Msg 3 at the RRC layer, and transmit the Msg 3 to the network device. The Msg 3 needs to carry identification information of the terminal device.

The Msg 3 is mainly used to notify the network device of the trigger event of the random access. For different trigger events of random access, the Msg 3 transmitted by the terminal device in Step 3 may include different contents.

For example, for an initial access scenario, the Msg 3 may include an RRC connection request message (RRC Setup Request) generated by the RRC layer. In addition, the Msg 3 may also carry, for example, a 5G Serving-Temporary Mobile Subscriber Identity (S-TMSI) of the terminal device or a random number.

In another example, for an RRC connection reestablishment scenario, the Msg 3 may include an RRC connection reestablishment request message (RRC Reestablishment Request) generated by the RRC layer. In addition, the Msg 3 may also carry, for example, a Cell Radio Network Temporary Identifier (C-RNTI).

In another example, for a handover scenario, the Msg 3 may include an RRC Handover Confirm message (RRC Handover Confirm) generated by the RRC layer, which carries the C-RNTI of the terminal device. In addition, the Msg 3 may also carry information such as a Buffer Status Report (BSR). For other trigger events such as uplink/downlink data arrival, the Msg 3 may include at least the C-RNTI of the terminal device.

Step 4: the network device transmits a contention resolution message, i.e., Msg 4, to the terminal device.

After transmitting the Msg3, the terminal device can start a random access contention resolution timer (ra-ContentionResolutionTimer), and receive the Msg4 from the network device while ra-ContentionResolutionTimer is running. If the terminal device receives the Msg 4 correctly, the contention resolution is completed.

Since in Step 3 the terminal device can include its own unique identification in the Msg 3, in the contention resolution mechanism, the network device will include the unique identification of the terminal device in the Msg4 to identify the terminal device that survives the contention. Other terminal devices that do not survive the contention resolution will re-initiate random access.

For example, if the terminal device includes the C-RNTI in the Msg 3, if the terminal device detects the PDCCH scrambled with the C-RNTI, it is considered that the contention is resolved.

Optionally, the Msg3 includes a Physical Uplink Shared Channel (PUSCH), and the C-RNTI may be carried in the PUSCH.

Compared with the contention-based four-step random access procedure, the contention-based two-step random access procedure can increase the delay and reduce the signaling overhead. The contention-based two-step random access may include the following steps.

Step 1: the terminal transmits a MsgA to the network, and the MsgA carries Msg1+Msg3 of the four-step random access.

Step 2: the network transmits a MsgB to the terminal, and the MsgB carries Msg2+Msg4 of the four-step random access. After the terminal transmits the MsgA, it starts a MsgB receiving window, and monitors and receives the MsgB within the receiving window.

Optionally, the MsgB may include a PDCCH scrambled with a MSGB-RNTI and a PDCCH scrambled with a C-RNTI.

For contention-based two-step random access, the UE may consider that the contention is successfully resolved when the PDCCH scrambled with the C-RNTI is received.

The first two steps in the contention-free-based four-step random access procedure is similar to those in the contention-based four-step random access procedure, the difference is that the preamble sequence transmitted by the terminal device in Step 1 is a dedicated preamble sequence. Therefore, the network device can identify the UE when receiving the dedicated preamble sequence. Therefore, the access procedure can be completed without the subsequent Step 3 and Step 4.

Optionally, for the contention-free-based four-step random access, the UE can start ra-ResponseWindow at the first occasion to monitor PDCCH after transmitting the Msg1, and monitor the PDCCH scrambled with the C-RNTI on the PDCCH search space corresponding to the recovery search space identifier (recoverySearchSpaceId) on the SpCell while ra-ResponseWindow is running.

Optionally, for the contention-based four-step random access, the UE can start ra-ResponseWindow at the next occasion to monitor PDCCH after transmitting the Msg 1, and monitor the PDCCH scrambled with the RA-RNTI on the SpCell while ra-ResponseWindow is running.

Optionally, for the contention-based two-step random access, the UE can start MSGB-ResponseWindow at the first occasion to monitor PDCCH after transmitting the MsgA, and monitor both the PDCCH scrambled with the MSGB-RNTI and the PDCCH scrambled with the C-RNTI on the SpCell while MSGB-ResponseWindow is running.

In some scenarios, the concept of DRX has been proposed for the purpose of power saving of terminals. Specifically, the network device can configure the terminal device to wake up at the time known by the network (DRX ON) to monitor the PDSCH, and the network can also configure the terminal device to sleep at the time known by the network (DRX OFF), i.e., the terminal device does not need to monitor the PDCCH. Therefore, if the network device 120 has data to transmit to the terminal device 110, the network device 120 can schedule the terminal device 110 during the DRX ON time of the terminal device 110, and during the DRC OFF time, since the radio frequency is turned off, the power consumption of the terminal can be reduced.

Figure 2:
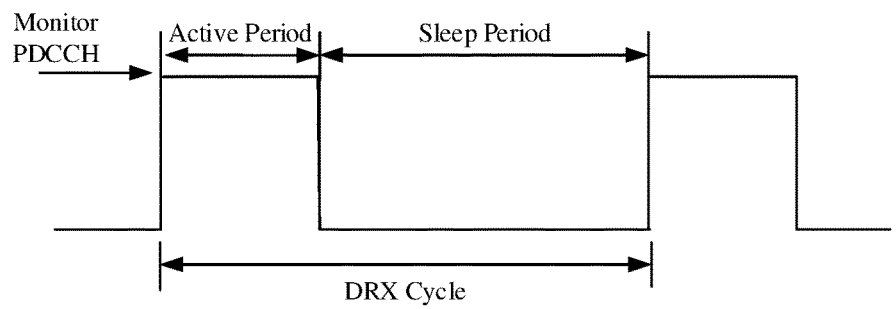
FIG. 2 is a schematic block diagram showing DRX according to an embodiment of the present disclosure.

As shown in FIG. 2, the DRX cycle configured by the network device for the terminal device consists of an active period (On Duration) and a sleep period (Opportunity for DRX). In the RRC CONNECTED mode, if the terminal device is configured with the DRX function, during the On Duration time, the terminal device monitors and receives the PDCCH, and the terminal device does not monitor the PDCCH during the sleep period to reduce power consumption.

It should be understood that in the embodiment of the present disclosure, the terminal device in the sleep period does not receive the PDCCH, but can receive data from other physical channels, and the embodiment of the present disclosure is not limited to this. For example, the terminal device may receive a Physical Downlink Shared Channel (PDSCH), acknowledgment/non-acknowledgment (ACK/NACK), and the like. In another example, in Semi-Persistent Scheduling (SPS), the terminal device may receive periodically configured PDSCH data.

In some embodiments, a DRX function may be configured for a Media Access Control (MAC) entity via Radio Resource Control (RRC) to control the behavior of the terminal device to monitor the PDCCH. That is, each MAC entity may correspond to a DRX configuration. Optionally, the DRX configuration may include at least one of:

DRX Duration Timer (drx-onDurationTimer): the duration for which the terminal device wakes up at the beginning of a DRX Cycle;

DRX Slot Offset (drx-SlotOffset): the delay for the terminal device to start drx-onDurationTimer;

DRX inactivity timer (drx-InactivityTimer): the duration for which the terminal device continues to monitor the PDCCH after the terminal device receives a PDCCH indicating an initial uplink transmission or an initial downlink transmission;

DRX downlink retransmission timer (drx-RetransmissionTimerDL): the longest duration for which the terminal device monitors the PDCCH indicating the downlink retransmission scheduling, each downlink HARQ process, except the broadcast HARQ process, corresponding to one drx-RetransmissionTimerDL;

DRX uplink retransmission timer (drx-RetransmissionTimerUL): the longest duration for which the terminal device monitors the PDCCH indicating uplink retransmission scheduling, each uplink HARQ process corresponding to one drx-RetransmissionTimerUL;

Long DRX cycle start offset (drx-LongCycleStartOffset): for configuring the long DRX cycle and the subframe offsets for the starts of the long DRX cycle and the short DRX cycle;

Short DRX cycle (drx-ShortCycle): the short DRX cycle, which is an optional configuration;

Short cycle timer (drx-ShortCycleTimer): the duration for which the terminal device is in a short DRX cycle (without receiving any PDCCH), which is an optional configuration;

DRX Downlink Hybrid Automatic Repeat reQuest (HARQ) Round Trip Time (RTT) Timer (drx-HARQ-RTT-TimerDL): the minimum waiting time expected to be required for the terminal device to receive the PDCCH indicating downlink scheduling, each downlink HARQ process, except the broadcast HARQ process, corresponding to one drx-HARQ-RTT-TimerDL; and DRX Uplink Hybrid Automatic Repeat reQuest (HARQ) Round Trip Time (RTT) Timer (drx-HARQ-RTT-TimerUL): the minimum waiting time expected to be required for the terminal device to receive the PDCCH indicating uplink scheduling, each uplink HARQ process corresponding to one drx-HARQ-RTT-TimerUL.

If the terminal device is configured with DRX, the terminal device needs to monitor the PDCCH at the DRX Active Time. The DRX Active Time includes the following cases:

any of drx-onDurationTimer, drx-InactivityTimer, drx-RetransmissionTimerDL, drx-RetransmissionTimerUL, and random access contention resolution timer (ra-ContentionResolutionTimer) is running;

the terminal device has transmitted an SR on the PUCCH and is in the pending state; and in the contention-based random access procedure, the terminal device has not received an initial transmission indicated by the PDCCH scrambled with the C-RNTI after successfully receiving the random access response.

In some embodiments, if drx-InactivityTimer expires and/or the terminal device receives a DRX Command Media Access Control Control Element (DRX Command MAC CE), the terminal device uses a long DRX cycle.

In some embodiments, if drx-ShortCycleTimer expires and/or the terminal device receives a long DRX command MAC CE, the terminal device uses a short DRX cycle.

In some embodiments, the terminal device may decide the time to start drx-onDurationTimer according to whether it is currently in a long DRX cycle or a short DRX cycle.

For example, if a short DRX cycle is used, and the current subframe satisfies [(SFN×10)+subframe number]modulo (drx-ShortCycle)=(drx-StartOffset) modulo (drx-ShortCycle).

In another example, if a long DRX cycle is used, and the current subframe satisfies [(SFN×10)+subframe number] modulo (drx-LongCycle)=drx-StartOffset.

Here, modulo represents a modulo operation.

In some embodiments, the terminal device may start drx-onDurationTimer in a time that is after a number, drx-SlotOffset, of slots after the current subframe.

In some embodiments, the condition for starting or restarting drx-InactivityTimer may include, but not limited to:

if the terminal device receives a PDCCH indicating an initial downlink or uplink transmission, the terminal device starts or restarts drx-InactivityTimer.

In some embodiments, the condition for starting and stopping drx-RetransmissionTimerDL may include, but not limited to:

when the terminal device receives a PDCCH indicating a downlink transmission, or when the terminal device receives a MAC PDU on a configured downlink grant resource, the terminal device stops drx-RetransmissionTimerDL corresponding to the HARQ process. After completing the transmission of the HARQ process feedback for the downlink transmission, the terminal device may start drx-HARQ-RTT-TimerDL corresponding to the HARQ process.

If the timer drx-HARQ-RTT-TimerDL corresponding to a certain HARQ of the terminal device expires, and the decoding of the downlink data transmitted using the HARQ process fails, the terminal device starts drx-RetransmissionTimerDL corresponding to the HARQ process.

In some embodiments, the condition for starting and stopping drx-RetransmissionTimerUL may include, but not limited to:

when the terminal device receives a PDCCH indicating an uplink transmission, or when the terminal device transmits a MAC Protocol Data Unit (PDU) on a configured uplink grant resource, the terminal device stops drx-RetransmissionTimerUL corresponding to the HARQ process. After completing the first repetition of the PUSCH, the terminal device starts drx-HARQ-RTT-TimerUL corresponding to the HARQ process.

If the timer drx-HARQ-RTT-TimerUL corresponding to a certain HARQ of the terminal device expires, the terminal device starts drx-RetransmissionTimerUL corresponding to the HARQ process.

In the 3GPP Rel-17, further researches have been carried out on the energy saving scheme for the UE configured with DRX in the connected state, including the scheme to reduce the UE's blind detection of PDCCH. One scheme is to introduce a PDCCH skipping mechanism, that is, the network can transmit dynamic signaling to instruct the UE to skip PDCCH monitoring for a period of time.

For a UE configured with DRX, the UE monitors the PDCCH during the DRX active time. When the UE receives the PDCCH skipping instruction, the UE shall follow the PDCCH skipping instruction, that is, skipping monitoring of PDCCH within the subsequent PDCCH skipping duration, even if the UE is in the DRX active time within this PDCCH skipping duration.

In general, the network device will control whether the terminal device shall skip monitoring of PDCCH based on downlink service requirements of the UE and uplink service requirements previously reported by the UE in a Buffer Status Report (BSR). For example, when the network considers that the UE has no uplink and downlink data transmission requirements in the future, the network may instruct the UE to skip monitoring of PDCCH within this period to achieve the purpose of saving power for the UE.

But in some scenarios, the UE may trigger uplink transmission by itself and expect further response from the network. For example, if the UE triggers a BFR for a certain serving cell, and the serving cell is an SpCell, the UE will initiate random access on the SpCell. In this case, since the UE expects a response from the network, the UE needs to monitor the PDCCH.

From the perspective of the network, the network can learn the scheduling requirement of the UE only after it receives the uplink information from the UE and correctly identifies the UE. The network does not know the scheduling requirement of the UE before receiving the uplink transmission from the UE and identifying the UE. For example, in one scenario, the network transmits a PDCCH skipping instruction to the UE before receiving the Msg 1 transmitted by the UE. From the perspective of the UE, the UE first transmits the Msg 1 to enter the state of monitoring the PDCCH. If the UE receives the PDCCH skipping instruction from the network during this period, how the UE can monitor the PDCCH while taking into account both the response from the network and the power saving of the UE is an urgent problem to be solved.

In view of this, the present disclosure provides a PDCCH monitoring scheme, capable of monitoring a PDCCH according to the relationship between i) a time interval between the terminal transmitting uplink information and receiving a PDCCH skipping instruction and ii) a Round-Trip Time (RTT) between the terminal device and the network device, which is beneficial to taking into account both receiving a response from the network and power saving of the UE.

Figure 3:
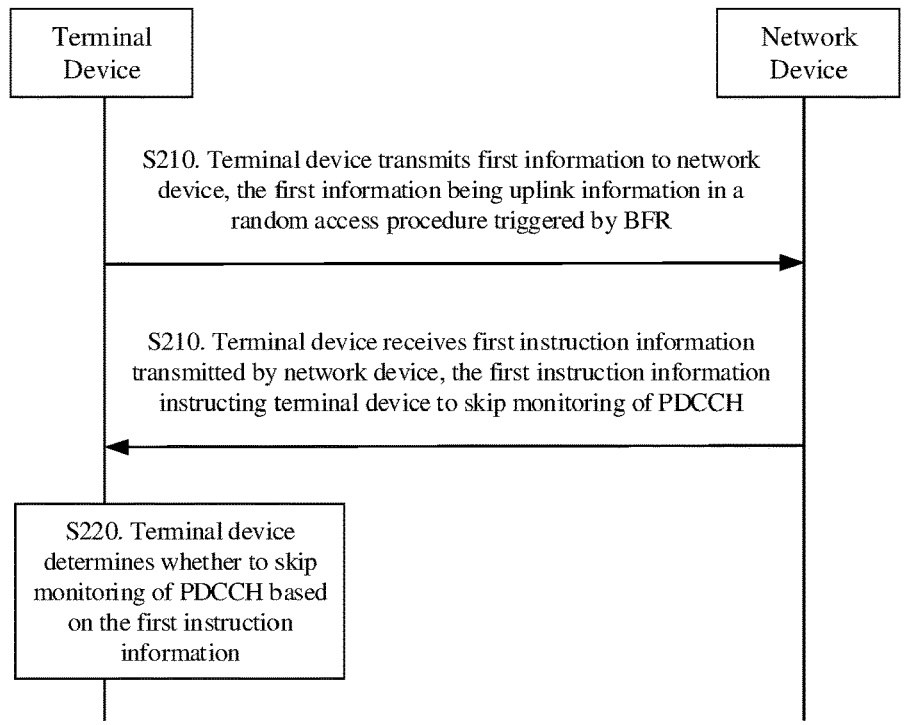
FIG. 3 is a schematic flowchart illustrating a wireless communication method according to an embodiment of the present disclosure.

FIG. 3 is a schematic interaction diagram illustrating a wireless communication method 200 according to an embodiment of the present disclosure. The method 200 may be executed by a terminal device in the communication system shown in FIG. 1. As shown in FIG. 3, the method 200 may include at least some of the following contents.

At S210, a terminal device transmits first information to a network device. The first information is uplink information in a random access procedure triggered by Beam Failure Recovery (BFR).

At S220, the terminal device receives first instruction information transmitted by the network device. The first instruction information instructs the terminal device to skip monitoring of Physical Downlink Control Channel (PDCCH).

At S230, the terminal device determines whether to skip monitoring of PDCCH based on the first instruction information.

Optionally, the embodiment of the present disclosure may be applied to a random access scenario triggered by BFR, or may be applied to random access scenarios triggered by other reasons, for example, handover or SR failure, etc., and the present disclosure is not limited to this.

Optionally, the first information may be uplink information in a random access procedure.

Optionally, the random access procedure may be contention-based random access, or may be contention-free-based random access. On the other hand, the random access procedure may be four-step random access, or two-step random access, the present disclosure is not limited to this.

Optionally, the random access procedure may be triggered by BFR. Alternatively, the random access procedure may be triggered by other reasons, for example, SR failure, etc., and the present disclosure is not limited to this.

Optionally, the BFR may be a BFR on an Spcell of the terminal device, and the Spcell may be a primary cell (Scell), or may be a primary secondary cell (PScell), or the BFR may be another BFR that can trigger random access. The following description will be given by taking the BFR on the Spcell as an example, but the present disclosure is not limited to this.

It should be noted that, in the embodiment of the present disclosure, the first information may alternatively be another uplink transmission triggered by the terminal device, or another uplink transmission that cannot be known by the network device. For example, the first information may be a scheduling request, and when the first instruction information is received, the SR is in a pending state, that is, the terminal device is in a state of waiting for the network to respond to the SR. In another example, the first information may be information transmitted on a Configured Grant (CG) resource, and the uplink transmission may be configured to require a feedback from the network, e.g., a Hybrid Automatic Repeat reQuest (HARQ) process corresponding to the CG resource is configured to start a HARQ feedback, or the HARQ feedback for the HARQ process corresponding to the CG resource is not canceled. In these cases, the terminal device expects a response from the network device after transmitting the first information, so the terminal device needs to monitor the PDCCH.

The following description will be given with reference to an example where the first information is the uplink information in a random access procedure caused by BFR, but the present disclosure is not limited to this.

As an embodiment, the first information may include a message 3 (i.e., Msg3) in a four-step contention-based random access procedure. The Msg3 includes a unique identification corresponding to the terminal device, for example, a Cell Radio Network Temporary Identifier (C-RNTI). That is, when the network device receives the Msg3, it can identify the terminal device based on the unique identification of the terminal device, so as to know the scheduling requirement of the terminal device.

As another embodiment, the first information may include a message A (i.e., MsgA) in a two-step contention-based random access procedure. The MsgA includes a preamble sequence (i.e., Msg1) and a unique identification corresponding to the terminal device, e.g., C-RNTI. Optionally, the C-RNTI is carried in a PUSCH. That is, when the network device receives the MsgA, it can identify the terminal device based on the unique identification of the terminal device, so as to know the scheduling requirement of the terminal device.

As yet another embodiment, the first information may include a preamble sequence (i.e., Msg1) in a contention-free-based four-step random access procedure. In this embodiment, the Msg1 is a dedicated preamble sequence, and the network device can identify the terminal device based on the Msg1, so as to know the scheduling requirement of the terminal device.

After the terminal device transmits the first information, since the network device does not know the uplink transmission from the terminal device, the network device may transmit the first instruction information, or PDCCH skipping instruction, to the terminal device, instructing the terminal device to skip monitoring of PDCCH.

Optionally, in some embodiments, the first instruction information may indicate a PDCCH skipping duration and/or a set of target serving cells where monitoring of PDCCH is to be skipped. That is, the network device instructs the terminal device to skip monitoring of PDCCH within the PDCCH skipping duration after receiving the first instruction information.

In this case, as an embodiment, the terminal device may skip monitoring of PDCCH according to the first instruction information.

As an example, the terminal device may determine, according to the first instruction information, to at least skip monitoring of PDCCH not used for BFR. For example, the monitoring of PDCCH not used for BFR can be skipped, while a PDCCH used for BFR can be monitored at the same time. This method is beneficial to ensuring a successful BFR process, and can also take into account the power saving requirement of the terminal. In another example, the terminal device may skip monitoring of all PDCCHs according to the first instruction information. Here, the PDCCH used for BFR may refer to a PDCCH used to carry BFR related information, which may be different for different application scenarios, and will be described in detail in the following specific embodiments, and details thereof will be omitted here.

It should be understood that, in an embodiment of the present disclosure, skipping monitoring of PDCCH according to the first instruction information may refer to skipping monitoring of PDCCH within the PDCCH skipping duration according to the first instruction information, and as to whether to monitor PDCCH in other time periods, it can be determined based on factors such as an instruction from the network, a DRX configuration, and whether the terminal device has a scheduling requirement, and the present disclosure is not limited to any of these examples.

In some other embodiments of the present disclosure, the terminal device may control monitoring of PDCCH based on a time interval between the terminal device transmitting the first information and the terminal device receiving the first instruction information and a first time length.

Optionally, the first time length may be determined based on Round-Trip Time (RTT) of signal transmission between the terminal device and the network device.

As an example, the RTT may be determined based on a Timing Advance (TA) indicated by the network device, for example, the first time length may be a TA corresponding to the terminal device.

As another example, the RTT may be determined based on a time length of a DRX uplink Hybrid Automatic Repeat reQuest (HARQ) RTT timer (drx-HARQ-RTT-TimerUL) configured by the network device. For example, the first time length may be a time length of drx-HARQ-RTT-TimerUL.

As yet another example, the RTT may be determined based on the time length of the DRX uplink HARQ RTT timer (drx-HARQ-RTT-TimerUL) and an RTT offset configured by the network device. The RTT offset may be an offset relative to the time length of drx-HARQ-RTT-TimerUL. That is, the time length of drx-HARQ-RTT-TimerUL may be understood as a reference time length, or in other words, a standard time length. For example, the first time length may be a sum of the time length of drx-HARQ-RTT-TimerUL and the RTT offset.

Optionally, different terminal devices may correspond to their respective RTT offsets.

As yet another example, the RTT may be determined based on location information of the terminal device and ephemeris information.

In some embodiments of the present disclosure, the terminal device may perform PDCCH monitoring as follows according to the time interval between transmitting of the first information and receiving of the first instruction information and the first time length:

the terminal device does not skip monitoring of PDCCH when the time interval between the terminal device transmitting the first information and receiving the first instruction information is shorter than or equal to the first time length; or the terminal device skips monitoring of PDCCH when the time interval is longer than the first time length.

Since there is a transmission delay between the terminal device and the network device, within the first time length after transmitting the first information, it can be considered that the network device has not received the first information transmitted by the terminal device. The network device may not consider the scheduling requirement of the terminal device when issuing the first instruction information. In this case, the terminal device can ignore the instruction of the first instruction information and continue to monitor the PDCCH, which is conducive to receiving the response from the network in time, so as to ensure a successful BFR.

If the time interval is longer than the first time length, the terminal device considers that the network device can receive the first information transmitted by the terminal device. When the network device issues the first instruction information regardless of the scheduling request from the terminal device, it can be considered that the network fails to receive data or identify the terminal device. In this case, the terminal device can skip monitoring of PDCCH according to the instruction of the first instruction information, which is beneficial to power saving of the terminal.

It should be noted that, in the embodiment of the present disclosure, the terminal device skipping monitoring of PDCCH, the terminal device not monitoring the PDCCH, the terminal device stopping monitoring of PDCCH, and the terminal device following (or complying with) the instruction of the first instruction information may be used interchangeably herein. Similarly, the terminal device not skipping monitor of PDCCH, the terminal device continuing to monitor the PDCCH, the terminal device monitoring the PDCCH, and the terminal device ignoring the instruction of the first instruction information may be used interchangeably herein. The present disclosure is not limited to any of these examples.

Optionally, in the embodiment of the present disclosure, the operation of the terminal device ignoring the PDCCH skipping instruction may be for all PDCCH search spaces of the terminal device, or only for a PDCCH search space used for BFR, e.g., a PDCCH search space corresponding to a PDCCH search space identifier (recoverySearchSpaceId) used for BFR, and the present disclosure is not limited to this.

In the following specific implementations of PDCCH monitoring will be described with reference to the three random access scenarios in the above embodiments.

Scenario 1: Contention-free-based four-step random access.

In Scenario 1, the terminal device receives RRC configuration information from the network device, and the RRC configuration information is used to configure BFR parameters for the SpCell. Optionally, the BFR parameters may include at least one of the BFR parameters in the above embodiments, and details thereof will be omitted here for brevity.

Further, when the terminal device triggers BFR for the Spcell and chooses to use contention-free-based four-step random access, it can transmit a Msg1 on the corresponding RACH resource based on the selected target reference signal, such as SSB or CSI-RS, start an RAR window, and monitor the RNTI scrambled with the C-RNTI within the RAR window.

In Scenario 1, the network device can identify the terminal device after receiving the Msg1 from the terminal device, and then may give a corresponding response. The Msg1 is a dedicated preamble sequence.

After transmitting the Msg1, if the terminal device receives a PDCCH skipping instruction transmitted by the network device, as an example, the terminal device may perform the following PDCCH monitoring operation based on the time interval between transmitting of the Msg1 and receiving of the PDCCH skipping instruction and the first time length:

1. If the time interval does not exceed the first time length, the terminal device may ignore the PDCCH skipping instruction, that is, continue to monitor the RNTI scrambled with the C-RNTI within the RAR window.

2. If the time interval exceeds the first time length, the terminal device may stop the RAR window. That is, the terminal device may stop monitoring the PDCCH scrambled with the C-RNTI, or may stop monitoring all the PDCCHs.

When the RAR window is stopped, the terminal device may consider that the reception of the random access response fails this time. If the number of transmissions of Msg1 has not exceeded the maximum number of transmissions (preambleTransMax) configured by the network, the terminal device can retransmit the Msg 1. If the number of transmissions of Msg1 has exceeded the maximum number of transmissions (preambleTransMax) configured by the network, the terminal device reports a random access problem to the higher layer.

In Scenario 1, the PDCCH used for BFR may refer to the PDCCH scrambled with the C-RNTI.

The specific implementation of Scenario 1 will be described with reference to the specific example in FIG. 4.

Figure 4:
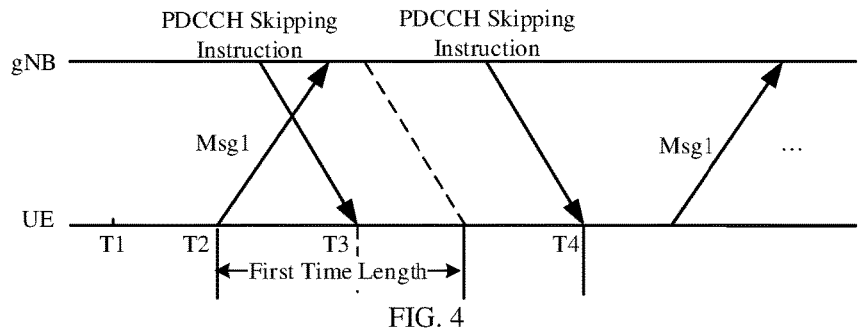
FIGS. 4 to 6 are schematic diagrams showing examples of monitoring of PDCCH according to an embodiment of the present disclosure.

As shown in FIG. 4, the UE triggers BFR at time T1, and transmits a Msg1 at time T2.

In one case, the UE receives the PDCCH skipping instruction from the network device at time T3, and the time interval between time T2 and time T3 is shorter than the first time length.

Further, the UE may control PDCCH monitoring according to the relationship between i) the time interval between time T2 and time T3 and ii) the first time length. Since the time interval between time T2 and time T3 is shorter than the first time length, the UE can ignore the PDCCH skipping instruction and continue to monitor the PDCCH scrambled with the C-RNTI, so as to receive the response from the network in time and ensure a successful BFR.

In another case, the UE receives the PDCCH skipping instruction from the network device at time T4, and the time interval between time T2 and time T4 is longer than the first time length.

Further, the UE may control PDCCH monitoring according to the relationship between i) the time interval between time T2 and time T4 and ii) the first time length. Since the time interval between time T2 and time T4 is longer than the first time length, the UE may stop the RAR window, that is, stop monitoring the PDCCH scrambled with the C-RNTI.

If the number of transmissions of Msg1 has not exceeded the maximum number of transmissions, the terminal device may retransmit the Msg1.

Scenario 2: Contention-based four-step random access.

In Scenario 2, the terminal device receives RRC configuration information from the network device, and the RRC configuration information is used to configure BFR parameters for the SpCell. Optionally, the BFR parameters may include at least one of the BFR parameters in the above embodiments, and details thereof will be omitted here for brevity.

In Scenario 2, the network device can identify the terminal device only after receiving the Msg3 from the terminal device, and then learn the scheduling requirement of the terminal device.

If the terminal device triggers BFR for the Spcell and chooses to use contention-based four-step random access, it can transmit a Msg1 on the corresponding RACH resource based on the selected target reference signal, such as SSB or CSI-RS, start an RAR window, and monitor the RNTI scrambled with the C-RNTI within the RAR window.

If the terminal device receives the PDCCH skipping instruction from the network device within the RAR window, the terminal device can skip monitoring of PDCCH not used for BFR, for example, the PDCCH scrambled with the C-RNTI, according to the PDCCH skipping instruction, and continue to monitor PDCCH used for BFR, e.g., the PDCCH scrambled with the RA-RNTI.

Further, when the RAR from the network device is received, a Msg3 may be transmitted to the network device, and a random access contention resolution timer (ra-ContentionResolutionTimer) is started, and while ra-ContentionResolutionTimer is running, a Msg4 from the network device is received. After transmitting the Msg3, if the terminal device receives the PDCCH skipping instruction from the network device, as an example, the terminal device may perform the following PDCCH monitoring operation according to the time interval between transmitting of the Msg3 and receiving of the PDCCH skipping instruction and the first time length:

1. If the time interval does not exceed the first time length, the terminal device may ignore the PDCCH skipping instruction, that is, continue to monitor the RNTI scrambled with the C-RNTI and the PDCCH scrambled with the TC-RNTI while ra-ContentionResolutionTimer is running.

2. If the time interval exceeds the first time length, the terminal device may skip monitoring of the PDCCH scrambled with the C-RNTI according to the PDCCH skipping instruction, and continue to monitor the PDCCH scrambled with the TC-RNTI.

In Scenario 2, the PDCCH used for BFR may include the PDCCH scrambled with the RA-RNTI and the PDCCH scrambled with the TC-RNTI.

The specific implementation of Scenario 2 will be described with reference to the specific example in FIG. 5.

Figure 5:
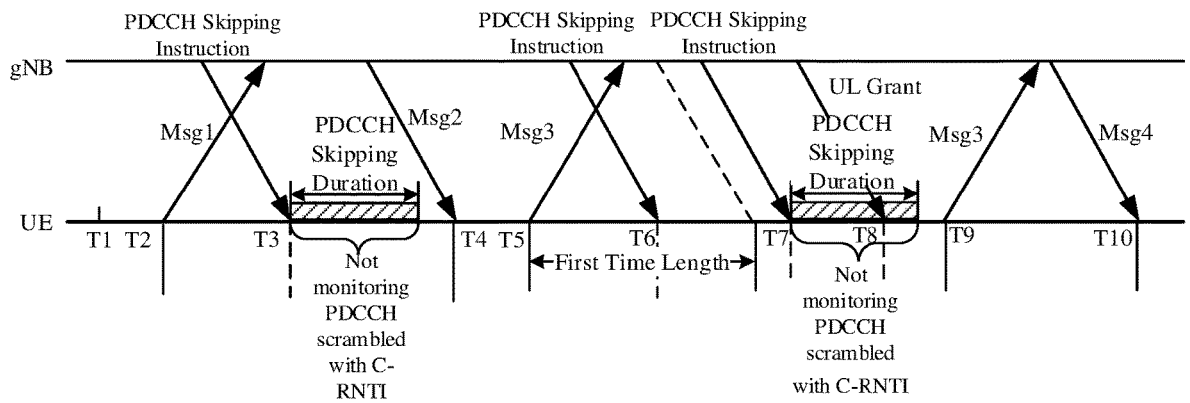

As shown in FIG. 5, the UE triggers BFR at time T1 and transmits a Msg1 at time T2.

In one case, the UE receives the PDCCH skipping instruction from the network device at time T3.

The UE may not monitor the PDCCH scrambled with the C-RNTI within the PDCCH skipping duration according to the PDCCH skipping instruction, and continue to monitor the PDCCH scrambled with the RA-RNTI.

A Msg2 transmitted by the network device is received at time T4, a Msg3 is transmitted to the network device at time T5, and ra-ContentionResolutionTimer is started.

Then, in one case, the UE receives the PDCCH skipping instruction from the network device at time T6. Here, the time interval between time T5 and time T6 is shorter than the first time length.

Further, the UE may control PDCCH monitoring according to the relationship between i) the time interval between time T5 and time T6 and ii) the first time length. Since the time interval between time T5 and time T6 is shorter than the first time length, the UE may ignore the PDCCH skipping instruction and continue to monitor the PDCCH scrambled with the C-RNTI and the PDCCH scrambled with the TC-RNTI.

In another case, the UE receives the PDCCH skipping instruction from the network device at time T7. Here, the time interval between time T5 and time T7 is longer than the first time length.

Further, the UE may control PDCCH monitoring according to the relationship between i) the time interval between time T5 and time T7 and ii) the first time length. Since the time interval between time T5 and time T7 is longer than the first time length, the UE may not monitor the PDCCH scrambled with the C-RNTI within the PDCCH skipping duration according to the PDCCH skipping instruction, and continue to monitor the PDCCH scrambled with the TC-RNTI.

At time T8, the UE receives the PDCCH scrambled with the TC-RNTI, indicating retransmission of the Msg3. Here, the PDCCH includes an uplink grant (UL grant) for retransmitting the Msg3.

At time T9, the UE retransmits the Msg3 and restarts ra-ContentionResolutionTimer.

At time T10, the UE receives a Msg4, stops ra-ContentionResolutionTimer, and completes the random access.

Scenario 3: Contention-based two-step random access.

In Scenario 3, the terminal device receives RRC configuration information from the network device, and the RRC configuration information is used to configure BFR parameters for the SpCell. Optionally, the BFR parameters may include at least one of the BFR parameters in the above embodiments, and details thereof will be omitted here for brevity.

Further, when the terminal device triggers BFR for the Spcell and chooses to use two-step contention-based random access, it can transmit a MsgA on the corresponding RACH resource based on the selected target reference signal, such as SSB or CSI-RS, start a MsgB receiving window (msgB-ResponseWindow), and monitors the PDCCH scrambled with the MSGB-RNTI and the PDCCH scrambled with the C-RNTI within msgB-ResponseWindow.

In Scenario 3, the network device can identify the terminal device after receiving the MsgA from the terminal device, and then may give a corresponding response.

After transmitting the MsgA, if the terminal device receives the PDCCH skipping instruction transmitted by the network device, as an example, the terminal device may perform the following PDCCH monitoring operation according to the time interval between transmitting of the MsgA and receiving of the PDCCH skipping instruction and the first time length:

1. If the time interval does not exceed the first time length, the terminal device may ignore the PDCCH skipping instruction, that is, continue to monitor the PDCCH scrambled with the MSGB-RNTI and the PDCCH scrambled with the C-RNTI within msgB-ResponseWindow.

2. If the time interval exceeds the first time length, the terminal device may skip monitoring of the PDCCH scrambled with the C-RNTI within the PDCCH skipping duration according to the PDCCH skipping instruction, and continue to monitor the PDCCH scrambled with the MSGB-RNTI.

In Scenario 3, the PDCCH used for BFR may include the PDCCH scrambled with the MSGB-RNTI.

The specific implementation of Scenario 3 will be described with reference to the specific example in FIG. 6.

Figure 6:
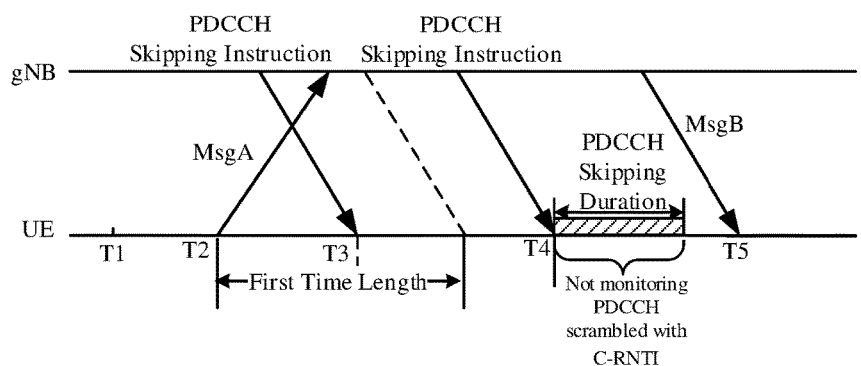

As shown in FIG. 6, the UE triggers BFR at time T1 and transmits a MsgA at time T2.

In one case, the UE receives the PDCCH skipping instruction from the network device at time T3. Here, the time interval between time T2 and time T3 is shorter than the first time length.

Further, the UE may control PDCCH monitoring according to the relationship between i) the time interval between time T2 and time T3 and ii) the first time length. Since the time interval between time T2 and time T3 is shorter than the first time length, the UE may ignore the PDCCH skipping instruction and continue to monitor the PDCCH scrambled with the C-RNTI and the PDCCH scrambled with the MSGB-RNTI.

In another case, the UE receives the PDCCH skipping instruction from the network device at time T4. Here, the time interval between time T2 and time T4 is longer than the first time length.

Further, the UE may control PDCCH monitoring according to the relationship between i) the time interval between time T2 and time T4 and ii) the first time length. Since the time interval between time T2 and time T4 is longer than the first time length, the UE may skip monitoring of the PDCCH scrambled with the C-RNTI and continue to monitor the PDCCH scrambled with the MSGB-RNTI.

In the embodiment of the present disclosure, when following the PDCCH skipping instruction, monitoring of the PDCCH not used for BFR is skipped, and monitoring of the PDCCH used for BFR is continued, which is beneficial to ensuring a successful BFR while taking into account the terminal's need for power saving.

Based on the above embodiments, after the terminal device transmits the uplink information for random access, if it receives the PDCCH skipping instruction from the network device, it can control monitoring of PDCCH based on the time interval between it transmitting the uplink information and it receiving the PDCCH skipping instruction and the RTT of signal transmission between the terminal device and the network device, thereby taking into account both receiving a response from the network and power saving of the terminal device.

The method embodiments of the present disclosure have been described in detail above with reference to FIGS. 3 to 6, and the apparatus embodiments of the present disclosure will be described in detail below with reference to FIGS. 7 to 9. It should be understood that the apparatus embodiments and the method embodiments correspond to each other, and for similar description, reference can be made to the method embodiments.

Figure 7:
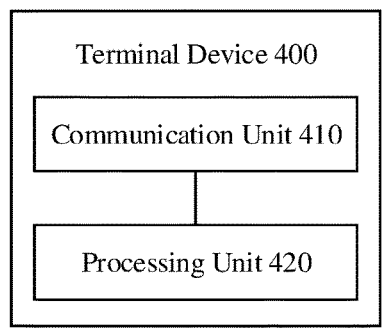
FIG. 7 is a schematic block diagram of a terminal device according to an embodiment of the present disclosure.

FIG. 7 shows a schematic block diagram of a terminal device 400 according to an embodiment of the present disclosure. As shown in FIG. 7, the terminal device 400 includes:

a communication unit 410 configured to transmit first information to a network device, the first information being uplink information in a random access procedure triggered by Beam Failure Recovery (BFR); and
receive first instruction information transmitted by the network device, the first instruction information instructing the terminal device to skip monitoring of Physical Downlink Control Channel (PDCCH); and
a processing unit 420 configured to determine whether to skip monitoring of PDCCH based on the first instruction information.

Optionally, the processing unit 420 may be further configured to: determine whether to skip monitoring of PDCCH based on a time interval between the terminal device transmitting the first information and the terminal device receiving the first instruction information and a first time length. The first time length is determined based on Round-Trip Time (RTT) of signal transmission between the terminal device and the network device.

Optionally, in some embodiments, the RTT may be determined based on at least one of:
  a time length of a Discontinuous Reception (DRX) uplink Hybrid Automatic Repeat reQuest (HARQ) RTT timer;
  the time length of the DRX uplink HARQ RTT timer and an RTT offset;
  location information of the terminal device and ephemeris information; or
  a Timing Advance (TA) indicated by the network device.

Optionally, in some embodiments, the processing unit 420 may be configured to:
  determine not to skip monitoring of PDCCH when the time interval is shorter than or equal to the first time length; or
  determine to skip monitoring of PDCCH when the time interval is longer than the first time length.

Optionally, in some embodiments, the communication unit 410 may be further configured to:
  monitor at least a PDCCH used for BFR in response to determining not to skip monitoring of PDCCH; or
  skip at least monitoring of PDCCH not used for BFR in response to determining to skip monitoring of PDCCH.

Optionally, in some embodiments, the operation of monitoring at least the PDCCH used for BFR may include:
  monitoring the PDCCH used for BFR only, and skipping monitoring of PDCCH not used for BFR; or
  monitoring all PDCCHs.

Optionally, in some embodiments, the operation of skipping at least monitoring of PDCCH not used for BFR may include:
  skipping monitoring of PDCCH not used for BFR, and continuing to monitor a PDCCH used for BFR; or skipping monitoring of all PDCCHs.

Optionally, in some embodiments, the PDCCH used for BFR may include at least one of:
  a PDCCH scrambled with a Cell Radio Network Temporary Identifier (C-RNTI);
  a PDCCH scrambled with a Random Access Radio Network Temporary Identifier (RA-RNTI);
  a PDCCH scrambled with a Message B Radio Network Temporary Identifier (MSGB-RNTI); or
  a PDCCH scrambled with a Temporary Cell Radio Network Temporary Identifier (TC-RNTI).

Optionally, in some embodiments, the communication unit 410 may be further configured to:
  monitor a PDCCH on all PDCCH search spaces in response to determining not to skip monitoring of PDCCH; or
  monitor a PDCCH on a PDCCH search space used for BFR in response to determining not to skip monitoring of PDCCH.

Optionally, in some embodiments, the first information may include a preamble sequence in a contention-free-based four-step random access procedure.

Optionally, in some embodiments, the communication unit 410 may be further configured to:
  monitor a PDCCH scrambled with a C-RNTI within a receiving window for Random Access Response (RAR) in response to determining not to skip monitoring of PDCCH; or
  close the receiving window for RAR in response to determining to skip monitoring of PDCCH.

Optionally, in some embodiments, the first information may include a Message 3 in a contention-based four-step random access procedure, the Message 3 including a Cell Radio Network Temporary Identifier (C-RNTI) corresponding to the terminal device.

Optionally, in some embodiments, the communication unit 410 may be further configured to:
  monitor a PDCCH scrambled with the C-RNTI and a Temporary Cell Radio Network Temporary Identifier (TC-RNTI) while a random access contention resolution timer is running, in response to determining not to skip monitoring of PDCCH; or
  skip monitoring of the PDCCH scrambled with the C-RNTI and continuing to monitor the PDCCH scrambled with the TC-RNTI while the random access contention resolution timer is running, in response to determining to skip monitoring of PDCCH.

Optionally, in some embodiments, the first information may include a Message 1 in a contention-based four-step random access procedure.

Optionally, in some embodiments, the processing unit 420 may be further configured to:
  determine, based on the first instruction information, to skip monitoring of PDCCH scrambled with C-RNTI in a PDCCH skipping duration indicated by the first instruction information, and to continue to monitor a PDCCH scrambled with a Random Access Radio Network Temporary Identifier (RA-RNTI).

Optionally, the first information may include a message A in a contention-based two-step random access procedure, the message A including a preamble sequence and a Physical Uplink Shared Channel (PUSCH), the PUSCH including a C-RNTI corresponding to the terminal device.

Optionally, in some embodiments, the communication unit 410 may be configured to:
  monitor a PDCCH scrambled with the C-RNTI and a PDCCH scrambled with a Message B Radio Network Temporary Identifier (MSGB-RNTI) within a receiving window for Message B in response to determining not to skip monitoring of PDCCH; or
  skip monitoring of PDCCH scrambled with the C-RNTI within the receiving window for Message B, and continue to monitor the PDCCH scrambled with the MSGB-RNTI, in response to determining to skip monitoring of PDCCH.

Optionally, in some embodiments, the network device may be a network device corresponding to a primary cell or a primary secondary cell of the terminal device.

It should be understood that the terminal device 400 according to the embodiment of the present disclosure may correspond to the terminal device in the method embodiment of the present disclosure, and the above and other operations and/or functions of the respective units in the terminal device 400 are provided for the purpose of implementing the process flow corresponding to the terminal device in the method 200 shown in FIGS. 3 to 6, and details thereof will be not omitted here for brevity.

Figure 8:
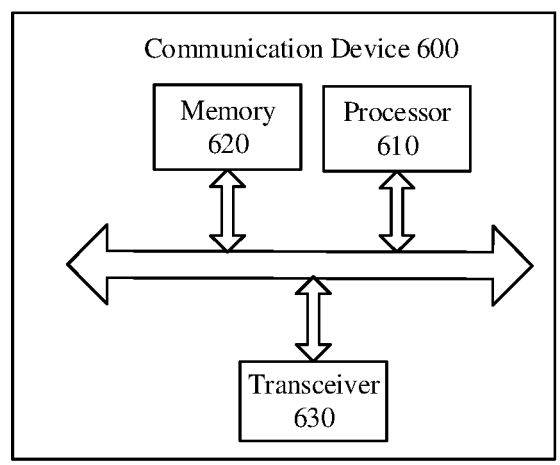
FIG. 8 is a schematic block diagram of a communication device according to another embodiment of the present disclosure.

FIG. 8 is a schematic diagram showing a structure of a communication device 600 according to an embodiment of the present disclosure. The communication device 600 shown in FIG. 8 includes a processor 610, and the processor 610 can invoke and execute a computer program from a memory to implement the method in the embodiment of the present disclosure.

Optionally, as shown in FIG. 8, the communication device 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, as shown in FIG. 8, the communication device 600 may further include a transceiver 630, and the processor 610 may control the transceiver 630 to communicate with other devices, and in particular, transmit information or data to other devices, or receive information or data transmitted by other devices.

Here, the transceiver 630 may include a transmitter and a receiver. The transceiver 630 may further include one or more antennas.

Optionally, the communication device 600 may specifically be the network device according to the embodiment of the present disclosure, and the communication device 600 may implement the corresponding processes implemented by the network device in any of the methods according to the embodiments of the present disclosure. For the sake of brevity, details thereof will be omitted here.

Optionally, the communication device 600 may specifically be the mobile terminal/terminal device according to the embodiment of the present disclosure, and the communication device 600 may implement the corresponding processes implemented by the mobile terminal/terminal device in any of the methods according to the embodiments of the present disclosure. For the sake of brevity, details thereof will be omitted here.

Figure 9:
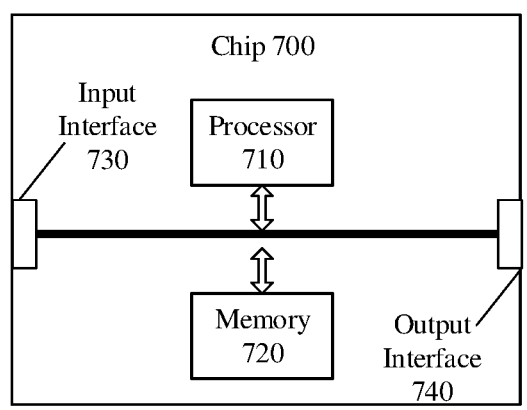
FIG. 9 is a schematic block diagram of a chip according to an embodiment of the present disclosure.

FIG. 9 is a schematic diagram showing a structure of a chip according to an embodiment of the present disclosure. The chip 700 shown in FIG. 9 includes a processor 710, and the processor 710 can invoke and execute a computer program from a memory to implement the method in the embodiment of the present disclosure.

Optionally, as shown in FIG. 9, the chip 700 may further include a memory 720. The processor 710 can invoke and execute a computer program from the memory 720 to implement the method in the embodiment of the present disclosure.

The memory 720 may be a separate device independent from the processor 710, or may be integrated in the processor 710.

Optionally, the chip 700 may further include an input interface 730. The processor 710 can control the input interface 730 to communicate with other devices or chips, and in particular, obtain information or data transmitted by other devices or chips.

Optionally, the chip 700 may further include an output interface 740. The processor 710 can control the output interface 740 to communicate with other devices or chips, and in particular, output information or data to other devices or chips.

Optionally, the chip can be applied to the network device in the embodiment of the present disclosure, and the chip can implement the corresponding processes implemented by the network device in the various methods of the embodiments of the present disclosure. For the sake of brevity, details thereof will be omitted here.

Optionally, the chip can be applied to the mobile terminal/terminal device in the embodiment of the present disclosure, and the chip can implement the corresponding processes implemented by the mobile terminal/terminal device in the various methods of the embodiments of the present disclosure. For the sake of brevity, details thereof will be omitted here.

Optionally, the chip in the embodiment of the present disclosure may also be referred to as a system-level chip, a system-chip, a chip system, or a system-on-chip.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:
transmitting, by a terminal device, first information to a network device, the first information being uplink information in a random access procedure triggered by Beam Failure Recovery (BFR);
receiving, by the terminal device, first instruction information transmitted by the network device, the first instruction information instructing the terminal device to skip monitoring of Physical Downlink Control Channel (PDCCH); and
determining, by the terminal device, whether to skip monitoring of PDCCH based on the first instruction information;
wherein the first information comprises a message A in a contention-based two-step random access procedure, the message A comprising a preamble sequence and a Physical Uplink Shared Channel (PUSCH), and the PUSCH comprising a Cell Radio Network Temporary Identifier (C-RNTI) corresponding to the terminal device; and the method further comprises:

monitoring, by the terminal device in response to determining not to skip monitoring of PDCCH, a PDCCH scrambled with the C-RNTI and a PDCCH scrambled with a Message B Radio Network Temporary Identifier (MSGB-RNTI) within a receiving window for Message B; or skipping, by the terminal device in response to determining to skip monitoring of PDCCH, monitoring of PDCCH scrambled with the C-RNTI and continuing to monitor the PDCCH scrambled with the MSGB-RNTI within the receiving window for Message B.

2. The method according to claim 1, wherein said determining, by the terminal device, whether to skip monitoring of PDCCH based on the first instruction information comprises:

determining, by the terminal device, whether to skip monitoring of PDCCH based on a time interval between the terminal device transmitting the first information and the terminal device receiving the first instruction information and a first time length, the first time length being determined based on Round-Trip Time (RTT) of signal transmission between the terminal device and the network device.

3. The method according to claim 2, wherein the RTT is determined based on at least one of:

a time length of a Discontinuous Reception (DRX) uplink Hybrid Automatic Repeat reQuest (HARQ) RRT timer;

the time length of the DRX uplink HARQ RRT timer and an RTT offset;

location information of the terminal device and ephemeris information; or a Timing Advance (TA) indicated by the network device.

4. The method according to claim 2, wherein said determining, by the terminal device, whether to skip monitoring of PDCCH based on the time interval between the terminal device transmitting the first information and the terminal device receiving the first instruction information and the first time length comprises:

determining, by the terminal device, not to skip monitoring of PDCCH when the time interval is shorter than or equal to the first time length; or determining, by the terminal device, to skip monitoring of PDCCH when the time interval is longer than the first time length.

5. The method according to claim 1, further comprising:

monitoring, by the terminal device, a PDCCH on all PDCCH search spaces in response to determining not to skip monitoring of PDCCH; or monitoring, by the terminal device, a PDCCH on a PDCCH search space used for BFR in response to determining not to skip monitoring of PDCCH.

6. The method according to claim 1, wherein the first information further comprises a preamble sequence in a contention-free-based four-step random access procedure.

7. The method according to claim 6, further comprising:

monitoring, by the terminal device, a PDCCH scrambled with a C-RNTI within a receiving window for Random Access Response (RAR) in response to determining not to skip monitoring of PDCCH; or closing, by the terminal device, the receiving window for RAR in response to determining to skip monitoring of PDCCH.

8. The method according to claim 1, wherein the first information further comprises a Message 3 in a contention-based four-step random access procedure, the Message 3 comprising a C-RNTI corresponding to the terminal device.

9. The method according to claim 8, further comprising:

monitoring, by the terminal device in response to determining not to skip monitoring of PDCCH, a PDCCH scrambled with the C-RNTI and a Temporary Cell Radio Network Temporary Identifier (TC-RNTI) while a random access contention resolution timer is running; or skipping, by the terminal device in response to determining to skip monitoring of PDCCH, monitoring of the PDCCH scrambled with the C-RNTI and continuing to monitor the PDCCH scrambled with the TC-RNTI while the random access contention resolution timer is running.

10. The method according to claim 1, wherein the first information further comprises a Message 1 in a contention-based four-step random access procedure.

11. The method according to claim 10, wherein said determining, by the terminal device, whether to skip monitoring of PDCCH based on the first instruction information comprises:

determining, by the terminal device based on the first instruction information, to skip monitoring of PDCCH scrambled with C-RNTI in a PDCCH skipping duration indicated by the first instruction information, and to continue to monitor a PDCCH scrambled with a Random Access Radio Network Temporary Identifier (RA-RNTI).

12. The method according to claim 1, wherein the network device is a network device corresponding to a primary cell or a primary secondary cell of the terminal device.

13. A terminal device, comprising a processor and a memory, wherein the memory has a computer program stored thereon, and the processor is configured to invoke and execute the computer program stored in the memory to:

transmit first information to a network device, the first information being uplink information in a random access procedure triggered by Beam Failure Recovery (BFR);

receive first instruction information transmitted by the network device, the first instruction information instructing the terminal device to skip monitoring of Physical Downlink Control Channel (PDCCH); and determine whether to skip monitoring of PDCCH based on the first instruction information;

wherein the first information comprises a message A in a contention-based two-step random access procedure, the message A comprising a preamble sequence and a Physical Uplink Shared Channel (PUSCH), and the PUSCH comprising a Cell Radio Network Temporary Identifier (C-RNTI) corresponding to the terminal device; and the processor is further configured to invoke and execute the computer program stored in the memory to:

monitor, in response to determining not to skip monitoring of PDCCH, a PDCCH scrambled with the C-RNTI and a PDCCH scrambled with a Message B Radio Network Temporary Identifier (MSGB-RNTI) within a receiving window for Message B; or skip, in response to determining to skip monitoring of PDCCH, monitoring of PDCCH scrambled with the C-RNTI and continue to monitor the PDCCH scrambled with the MSGB-RNTI within the receiving window for Message B.

14. The terminal device according to claim 13, wherein the first information further comprises a preamble sequence in a contention-free-based four-step random access procedure.

15. The terminal device according to claim 14, wherein the processor is further configured to invoke and execute the computer program stored in the memory to:
monitor a PDCCH scrambled with a C-RNTI within a receiving window for Random Access Response (RAR) in response to determining not to skip monitoring of PDCCH; or
close the receiving window for RAR in response to determining to skip monitoring of PDCCH.

16. The terminal device according to claim 13, wherein the first information further comprises a Message 3 in a contention-based four-step random access procedure, the Message 3 comprising a C-RNTI corresponding to the terminal device.

17. The terminal device according to claim 16, wherein the processor is further configured to invoke and execute the computer program stored in the memory to:
monitor, in response to determining not to skip monitoring of PDCCH, a PDCCH scrambled with the C-RNTI and a Temporary Cell Radio Network Temporary Identifier (TC-RNTI) while a random access contention resolution timer is running; or
skip, in response to determining to skip monitoring of PDCCH, monitoring of the PDCCH scrambled with the C-RNTI and continue to monitor the PDCCH scrambled with the TC-RNTI while the random access contention resolution timer is running.

18. The terminal device according to claim 13, wherein the first information further comprises a Message 1 in a contention-based four-step random access procedure.

19. The terminal device according to claim 18, wherein the processor is further configured to invoke and execute the computer program stored in the memory to:
determine, based on the first instruction information, to skip monitoring of PDCCH scrambled with C-RNTI in a PDCCH skipping duration indicated by the first instruction information, and to continue to monitor a PDCCH scrambled with a Random Access Radio Network Temporary Identifier (RA-RNTI).

20. A non-transitory computer-readable storage medium, storing a computer program which, when executed by a processor, causes the computer to:
transmit first information to a network device, the first information being uplink information in a random access procedure triggered by Beam Failure Recovery (BFR);
receive first instruction information transmitted by the network device, the first instruction information instructing the terminal device to skip monitoring of Physical Downlink Control Channel (PDCCH); and
determine whether to skip monitoring of PDCCH based on the first instruction information;
wherein the first information comprises a message A in a contention-based two-step random access procedure, the message A comprising a preamble sequence and a Physical Uplink Shared Channel (PUSCH), and the PUSCH comprising a Cell Radio Network Temporary Identifier (C-RNTI) corresponding to the terminal device; and
the computer program which, when executed by the processor, causes the computer further to:
monitor, in response to determining not to skip monitoring of PDCCH, a PDCCH scrambled with the C-RNTI and a PDCCH scrambled with a Message B Radio Network Temporary Identifier (MSGB-RNTI) within a receiving window for Message B; or
skip, in response to determining to skip monitoring of PDCCH, monitoring of PDCCH scrambled with the C-RNTI and continue to monitor the PDCCH scrambled with the MSGB-RNTI within the receiving window for Message B.

\* \* \* \* \*